Sept. 28, 1954  H. E. HANCOCK ET AL  2,690,236
ELEVATOR CALL AND AUTOMATIC LEVELING SYSTEM
Filed March 29, 1951  3 Sheets-Sheet 1

INVENTORS.
Harold E. Hancock.
BY Carl A. Schneider.

Wood, Herron & Evans.
ATTORNEYS.

Sept. 28, 1954  H. E. HANCOCK ET AL  2,690,236
ELEVATOR CALL AND AUTOMATIC LEVELING SYSTEM
Filed March 29, 1951  3 Sheets-Sheet 2

INVENTORS.
Harold E. Hancock.
BY Carl A. Schneider.
Wood, Herron & Evans.
ATTORNEYS.

Patented Sept. 28, 1954

2,690,236

UNITED STATES PATENT OFFICE 2,690,236

ELEVATOR CALL AND AUTOMATIC LEVELING SYSTEM

Harold E. Hancock, Loveland, and Carl A. Schneider, Cincinnati, Ohio, assignors to The Shepard Elevator Company, Cincinnati, Ohio, a corporation of Ohio Application March 29, 1951, Serial No. 218,134

20 Claims. (Cl. 187—29)

1

This invention relates to elevators and is particularly directed to a novel call and automatic leveling system by means of which an elevator cab may be brought into accurate vertical alignment with the various floors of a building.

It is highly essential that an elevator cab can be brought into close alignment with each of the floor levels at which it is stopped. If the misalignment between the cab and floor is allowed to exceed more than a small fraction of an inch, an inherently dangerous situation is created in that careless or infirm passengers are liable to stumble and fall when entering or leaving the cab. Furthermore, if the elevator is being used to carry heavy freight, the cab and floor must be accurately leveled or it will be impossible to roll or slide goods from the car onto the floor.

An additional consideration is that modern high speed elevators are impractical unless the stopping and leveling operations can be accomplished proportionally as rapidly as the actual floor-to-floor speed of the cab itself. It is further desirable that leveling can be accomplished in a single smooth continuous motion; that is, the cab should slide into the floor level and then stop at a point in alignment with the selected floor. Single motion cab positioning is preferable since it is quicker and also much smoother than that type of positioning in which the cab stops out of level with the floor and which requires several corrective jogs to bring it into alignment. Smoothness of operation may even be a paramount consideration in certain installations where delicate apparatus is being moved or as in hospitals where it could be quite harmful for patients to be jarred.

Several methods of automatic elevator leveling are presently in use, some of the well known types being adopted solely for use with direct current, variable speed elevator motors. An elevator cab which is raised or lowered by a variable speed motor is much easier to level properly than one having a single speed drive, since an adjustable speed motor permits rapid cab movement for a large portion of the cab travel while allowing the speed of the cab to be greatly reduced upon approaching the selected floor so that the cab may be driven slowly into the proper floor level.

Usually, however, a variable speed motor requires a rheostat, or as in the Ward Leonard system, a high speed auxiliary motor-generator set. The electrical power loss caused by the high resistance of the rheostat makes it uneconomical, while the Ward Leonard system has the obvious

2 disadvantage that it requires a relatively expensive motor-generator set in addition to the elevator motor.

On the other hand, those methods of elevator control which have hitherto been used with elevators driven by alternating current, single speed motors, or motors having a small number of fixed speeds have either been only partially effective in their function, allowing too much misalignment, or have required considerable corrective jogging to compensate for the undertravel or overtravel of the elevator cab with respect to the floor. Furthermore, the leveling devices heretofore employed have been complex, expensive to install and difficult to maintain.

In a typical elevator controller system of the type previously employed, the circuits to the elevator motor switches are controlled mechanically through a brush-commutator arrangement, the commutator providing a series of switch contacts corresponding to the levels at which the car is to stop. The commutator may be driven in synchronism with the car relative to stationary brushes, or contacts, corresponding to various floor stopping positions or, on the other hand, a series of brushes may be translated in synchronism with the car relative to a stationary commutator having one or more stop segments.

In either case, a circuit to the elevator motor and brake solenoid, or more specifically to the elevator motor and brake solenoid controlling switches, is maintained so long as the brush and energized portion of the commutator are in contact and the circuit is disrupted as the brush or brushes serially leave the energized section and engage the insulated stop segment. It is necessary that the stop segment be sufficiently long to permit the brush to ride upon it at least a distance corresponding to the average distance travelled by the car in coming to a stop after power disruption. However, a stop segment long enough to accommodate the average glide, may, because of the variations in the distance travelled by the car after power disruption, permit the car to be undesirably and even badly misaligned with the floor.

As one example of a more complicated arrangement, a second series of elements is provided on the commutator to act as secondary circuit makers through which the elevator motor may be subsequently reenergized if the brush and stop segments (and hence the car and building floor) are not aligned properly when the car comes to rest. A control system of this type requires that many different brush-commutator segment contacts be made and broken in timed relationship to bring the car into level with the floor. This necessitates maintaing each of the brushes, stop segments, and leveling segments in accurate alignment and their relative movement in exact synchronous relationship with the cab movement. When properly adjusted, these controls do enable the elevator to be leveled more accurately than is possible with a simpler system, but they have only a slight effect toward reducing the excessive jogging required to correct the original error in overshooting or undershooting the selected floor.

We have determined that an elevator cab driven by a single speed alternating current motor may be leveled accurately and smoothly, by making the elevator motor an element of a closed loop, null-seeking servo-mechanism which includes a means for varying the point of application of the brake with the velocity of the car. This system which provides single motion positioning also eliminates the need for the plurality of accurately adjusted brushes, stop segments, and leveling segments moving in synchronism with the cab. However, in order that the full significance of this advance may be fully appreciated, it is helpful to briefly discuss the problems which are inherent in providing accurate elevator control.

A typical installation in which my invention might be used includes an elevator cab which is raised or lowered by means of a single speed alternating current motor, such as a polyphase induction motor. The cab movement is stopped and the cab is held stationary by means of a conventional friction brake which is normally urged into the braking or set position and is released only in response to energization of a solenoid. That is, the brake is released and the cab is free to move so long as the solenoid is energized, but the brake will set, stopping the cab if there is any interruption to the current supply. The solenoid and elevator motor are arranged so that they are energized simultaneously and consequently the brake is applied whenever the motor circuit is open. In such an installation the cab may be summoned to any floor in response to the depression of a call button located on that particular floor or may be directed to a selected floor by the depression of a proper button located within the cab.

Since the elevator motor can be run only at a single speed, and the brake is solenoid operated, there are only two operating conditions obtainable. Either the motor is run at its normal speed with the solenoid energized to hold the brake in released position, or the motor and the solenoid are completely deenergized and the brake is applied. Once the motor and solenoid circuits are interrupted, the brake remains set and the motor circuit remains open until the cab comes to rest. It is apparent that in order to insure the cab and floor being properly aligned when the cab comes to rest, the point of application of the brake must be carefully controlled to allow the cab just the required sliding distance before reaching the floor.

The control of the proper brake application point is extremely difficult, however, since the required sliding distance and hence the location of the braking point with respect to the floor are dependent upon many variable factors. In the first place, the proper point is dependent upon the load of the car which may vary from no load when the cab is summoned to a floor, to full load when the cab is carrying heavy freight or a maximum number of passengers. Secondly, the braking point is affected by the direction of motion of the car, as well as the relative weights of the cab and counterbalance. The velocity of the car, which may vary quite appreciably, also affects the required stopping distance. An additional complication is interjected by the fact that the slide distance of the cab after the brake is applied is not directly proportional to the velocity of the cab because of the large difference between the static and slide friction of the brake. In other words, it requires a sliding distance several times greater to stop a car moving 200 feet a minute than it would take to stop one moving at half that speed.

Briefly, this invention is predicated upon the novel concept of providing a control circuit for an elevator motor and brake solenoid in which a voltage is introduced which is proportional to the height of the floor selected relative to an arbitrary reference such as the basement level. At the same time, the position of the cab relative to the same reference is represented by the magnitude of a cab position voltage which is placed in series opposition with the floor position voltage. When the cab is properly leveled at the selected floor level, the two voltages will be equal in magnitude, but since they are in opposition, their sum will be zero. If the car is not properly leveled, the sum of the cab position and floor position voltages will be positive or negative as the cab is respectively above or below the proper floor. This voltage sum, then, represents an "error" voltage which is proportional to the distance separating the cab and the selected floor and has a sign which is dependent upn the relative position of the two. The "error" voltage is amplified and is used to control up and down direction contactors which connect the line voltage to the motor. The contactor arrangement is such that the system is made null seeking, that is, the motor always runs in such a direction that the error voltage will be reduced to zero, and, consequently, the cab is always driven in the direction of the selected floor. Whenever the "error" voltage reaches zero, the motor circuit is opened and the solenoid is deenergized, applying the brake.

The second novel feature of our leveling system is the provision of a means for opening the motor power line and applying the brake to the motor shaft at a distance from the floor level which is determined directly by the velocity of the cab, and indirectly by the load of the cab, since the former is dependent upon the latter. The means for thus determining the braking point include a tachometer or small generator which is mechanically interconnected with the motor so that it generates a signal which is at all times proportional to the velocity of the cab. The tachometer voltage signal is applied in series, with the cab position and floor position voltages and its polarity is such that when the cab is running toward the selected floor, the tachometer signal subtracts from the floor position signal in the same manner as the cab position voltage.

Three voltages, then, are introduced into the control circuit, and their sum is amplified and used to govern the elevator motor operation and application of the brake. The voltage sum or error voltage is determined by subtracting from the floor position voltage (proportional to the floor height above a reference), the cab position voltage (proportional to the cab height above the reference), and the tachometer signal (proportional to the velocity of the cab). It is obvious that for any given distance between the floor and cab, that an increase in cab velocity will be accompanied by a corresponding decrease in the error voltage, or viewed differently, the higher the cab velocity the greater the distance from the floor level at which the error voltage will become zero. Zero error voltage is reached and the brake is thus applied at a distance from the floor determined by the car velocity.

Another important objective of the present invention has been to provide a control circuit which compensates for the variance in the frictional coefficient of the brake. Since a frictional brake is considerably more effective at slow speeds than at high ones, the required sliding or braking distance increases all out of proportion to an increase in cab velocity. The compensation for this is effected by including a resistance network in the control circuit which causes the tachometer signal to vary as the $n$th power of the cab velocity ($n$=some number greater than 1 depending upon the brake). As a result the error voltage will become zero and the brake will be applied at a distance from the floor which is proportional to the $n$th power of the cab velocity. By properly selecting $n$, the braking point may be controlled so that regardless of the load, the elevator will level with the floor in one continuous motion without any corrective jogs.

An additional objective of this invention has been to provide a control circuit which will prevent the motor from being plugged i. e. being connected in reverse while mechanically running forward, if for some reason the cab should overshoot the floor. Once the error voltage has reached zero and the motor circuit is opened, it is prevented from closing again until the cab has come to rest.

While this invention has been discussed primarily with respect to elevators driven by single speed alternating current motors, it will be appreciated that its use may be advantageous in many diverse installations involving similar problems of control and leveling. The principles of the present invention are fully applicable to single speed, two speed, multi-voltage and variable voltage alternating or direct current systems, and those skilled in the art will readily comprehend the various modifications to which this invention is susceptible.

Other objects and advantages of my invention will be apparent from a further consideration of the specification in conjunction with the drawings in which.

Figure 1:
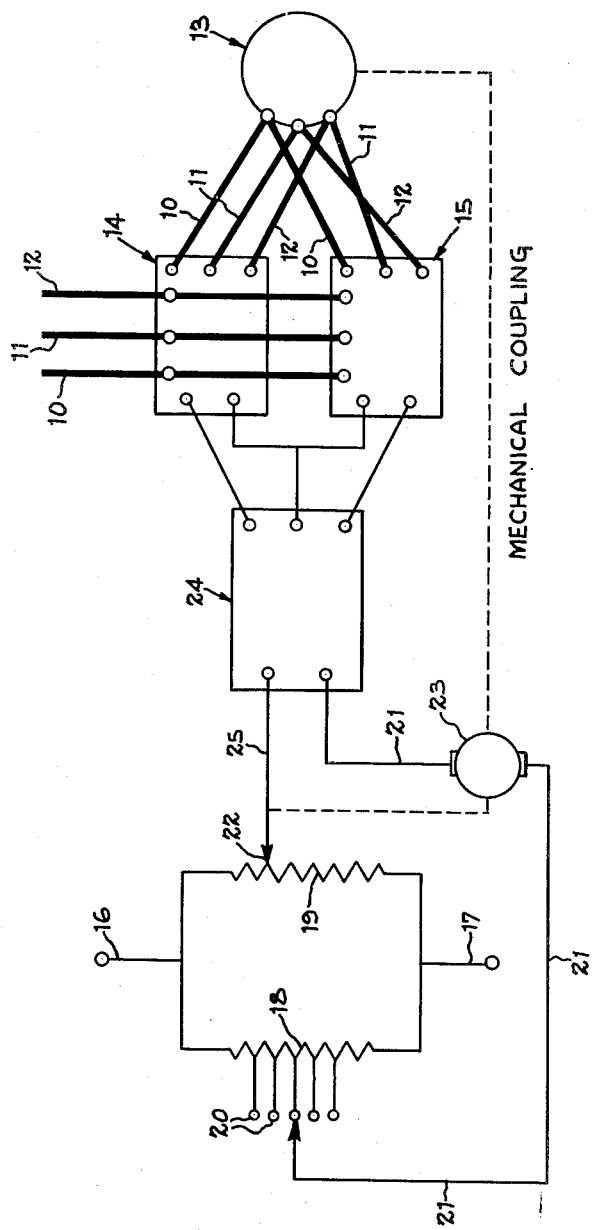
Figure 1 is a greatly simplified schematic diagram of the call and leveling circuit.

The leveling system, as shown in simplified schematic form in Figure 1, includes main power supply lines 10, 11 and 12 which energize a motor and a brake solenoid shown generally at 13. Control of the power circuits to the motor and brake solenoid 13 is maintained by up and down contactors 14, 15. These contactors either open the motor and brake solenoid circuit or close the power circuit so that the brake will be released and the motor will operate to drive the cab toward the selected floor.

A control voltage is supplied through lines 16 and 17 across a variable resistance 18 and a potentiometer 19 connected in parallel. The variable resistance 18 is provided with a plurality of taps 20, the particular tap which is connected to line 21 being determined by the depression of a call button associated with the floor selected. The magnitude of the voltage drop across the resistance 18 is made proportional to the height of the selected floor above the bottom of the shaft. The potentiometer 19 has a tap 22 which is moved relative to the potentiometer coil in synchronism with the cab movement so that the voltage drop of the potentiometer is proportional to the distance of the cab above the bottom of the shaft.

An "error" voltage representing the difference in height between the cab and the selected floor is thus obtained across line 21 and tap 22. This error voltage will be zero when the voltage drops across the potentiometer and variable resistance are equal, that is, when the cab is properly aligned with the selected floor. If the cab is not levelled at the selected floor, the error voltage will be proportional in magnitude to the distance between the cab and the selected floor and will have a plus or minus polarity indicating whether the cab is above or below the floor.

A tachometer, or small direct current generator 23, is inserted in line 21 in series with the floor level signal. The tachometer 23 is mechanically interconnected with the motor 13 and has the characteristic that it generates a voltage signal which is proportional to the speed of the cab. The polarity of the tachometer 23 is such that when the car is running toward the selected floor, the tachometer voltage is opposed to the floor position voltage and hence subtracts from it in the same way as the cab position signal. Consequently, the greater the cab velocity the lower the difference which will obtain between the floor level signal and the car position signal. The tachometer signal thus causes the error voltage to reach zero before the cab actually levels with the floor and the distance from the floor at which the error voltage reaches zero is made proportional to the velocity of the cab.

The error voltage is connected to the input side of an amplifier 24 through leads 21, 25. The output characteristic of the amplifier 24 is such that for one polarity of error voltage the up relay contact 14 will be energized, for the opposite polarity the down relay contact 15 will be energized. Whenever either of these contacts is energized, the line voltage is supplied to the motor and brake solenoid so that the brake is released and the motor drives the cab. It will be noted that two of the motor leads from contactor 15 are reversed so that the motor runs in one direction when the down contact 15 is energized and in the opposite direction when the up contact 14 is energized. The motor is thus made to run in such a direction as to reduce the error voltage to zero, and the cab is always driven toward the selected floor.

In operation, when a particular floor is selected, a tap 20, corresponding to the call button depressed, is connected to line 21 and an error voltage is produced across lines 21 and 25 which apply it to the error amplifier 24. The polarity of this voltage, which is dependent upon whether the cab is positioned above or below the selected floor, determines whether the up or down direction contactor is energized. The appropriate contactor is energized by the output of the error amplifier to close the motor and brake solenoid circuits, releasing the brake and causing the motor to run toward the selected floor, a direction which tends to reduce the error voltage to zero. As the elevator cab starts to move, the tachometer generates a direct current voltage which is opposed to the floor position signal and which causes the error voltage to be reduced and to reach zero before the cab reaches the selected floor level. Whenever the error voltage reaches zero, the contactor is deenergized, opening the motor circuit and applying the brake. The brake is thus applied at the proper distance from the floor to cause the cab to slide in one continuous motion into the proper floor level and there come to rest. Should the cab stop short of the floor level for any reason, the error voltage will reenergize the proper contactor to drive the cab into proper alignment with the floor. If the cab overshoots the floor, the polarity of the error signal will be reversed so that the other contactor will be energized and the motor will cause the leveling correction to be made in the opposite direction.

Figure 2:
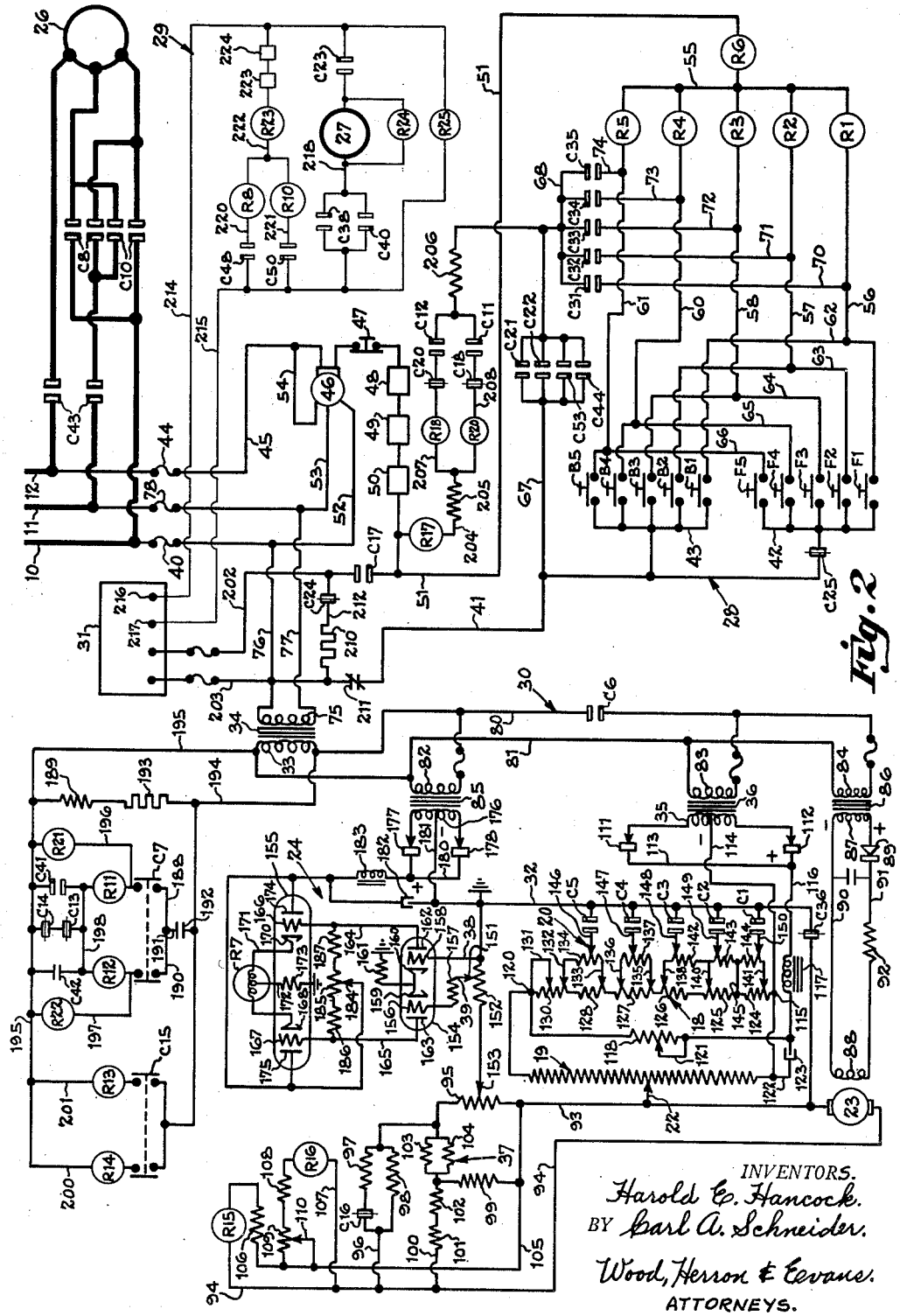
Figure 2 is a schematic circuit diagram of the call and automatic leveling system.
Figure 3:
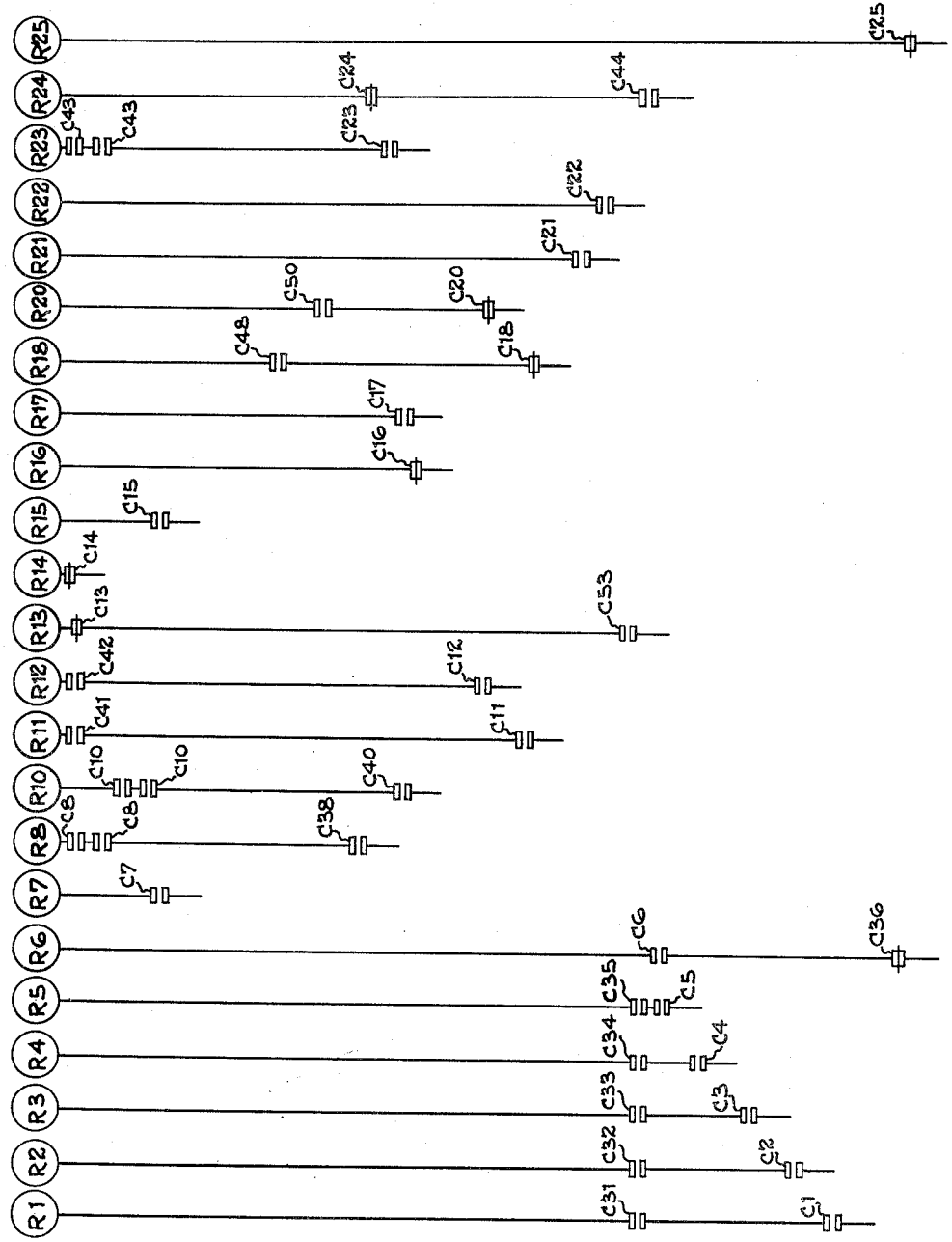
Figure 3 is a diagrammatic view for use in conjunction with Figure 2, showing the relays and their associated contacts, the contacts being shown in the same vertical relationship on the page as the contacts in Figure 2.

Figure 2 is a schematic circuit diagram of a call and leveling system. Figure 2 can best be examined in conjunction with Figure 3 which shows the relationship of the relay coils and their associated contents. By placing Figures 2 and 3 in sideways alignment, the contacts of Figure 2 may be located by first locating the associated coil in Figure 3, dropping down the sheet to the point where the contact is marked, and then moving horizontally back to Figure 2 to the contact in question. A three phase alternating current motor 26, energized from main power supply lines 10, 11 and 12, is used to drive the elevator cab. Operation of the motor is controlled by up contactors C8 and down contactors C10. A conventional friction brake for stopping the cab is controlled by solenoid 27 which is energized simultaneously with the motor in a manner explained below. The brake arm and solenoid 27 are so arranged that the brake is released only when the solenoid is energized (whenever the motor current is closed), and will set if there is any interruption to the current supply.

The call and leveling systems may be considered as comprising three principal sub-circuits; namely, the call button circuit, indicated generally at 28, a rectifier output circuit, indicated generally at 29, and a control circuit, indicated generally at 30.

The rectifier circuit 29 is powered by the output of rectifier 31 and includes the brake solenoid 27 and up and down relay coils R8 and R10, which actuate up and down contacts C8 and C10. The brake solenoid 27 and the appropriate up or down relay coil are energized whenever power is supplied to the rectifier so that one function of the control circuit must be to govern the rectifier input.

The call button circuit 28 provides a means of selecting the floor to which the elevator is to be driven and includes floor buttons F1, F2, F3, F4, and F5 which are located on the respective floors of a building, and cab buttons B1, B2, B3, B4, and B5 which are located within the cab. The depression of any of these buttons energizes a corresponding relay R1, R2, R3, R4, R5, closing a contact C1, C2, C3, C4, or C5 to connect a particular tap 20 of a floor level resistor network 18 to line 32. The depression of any of the call buttons also energizes relay coil R6 which controls the power supply to the control circuit.

The control circuit 30 governs the power input of the rectifier and determines whether the up or down relay is energized by the rectifier output. This circuit is energized from a secondary 33 of transformer 34, whenever relay R6 is energized and its contact C6 closed. Secondary 35 of transformer 36 provides the control voltage and is connected across the potentiometer coil 19 and the floor level resistance network 18 which are arranged in parallel. Tachometer 23, having an output resistance network indicated generally at 37, is connected in series with the potentiometer tap 22 which is moved relative to potentiometer coil 19 in synchronism with the elevator cab position.

The floor signal tap 20 is connected to one of the input leads 38 of amplifier 24 and tachometer 23 and potentiometer tap 22 are connected to the other amplifier input lead 39. The output of error amplifier 24 operates polarized relay R7 which in turn energizes a succession of relays to close the rectifier input circuit. Polarized relay R7 also determines whether the up or down relay will be energized, along with the brake solenoid, by the output of rectifier 31.

A more detailed description of the sub-circuit arrangements embodied in the control and leveling systems illustrated in the drawings follows.

*Call button circuit*

The voltage for the call button circuit 28 is taken from power lines 10 and 12. Power line 10 is connected through fuse 40, lead 76 and line 41 to conductors 42 and 43. Line 12 passes through fuse 44 and line 45, which contains a reverse phase sequence relay 46, and the usual stop button 47, stop limit switch 48, governor switch 49, and release catch switch 50 to lead 51.

The coil of the reverse phase sequence relay 46 is connected to power lines 10, 11, and 12 by leads 52, 53, and 54 respectively. The function of this relay is to prevent a contact, which normally keeps line 45 open, from closing if an improper phase sequence is present in the power supply lines 10, 11, and 12. The reverse phase sequence relay also prevents the contact from closing line 45 regardless of the phase sequence if any of the lines 10, 11, and 12 are removed, thereby preventing single phase operation of the motor. The operation of this relay is of no consequence to the present invention since, along with the stop button, limit switch, governor switch, and release catch switch, it constitutes a safety device which may be used with any call and leveling system.

Lead 51 contains the coil of relay R6 and is joined to conductor 55. A plurality of parallel lines, 56, 57, 58, 60, and 61, join conductors 42 and 55. Each of the lines 56, 57, 58, 60, and 61 contain a floor button F1, F2, F3, F4, F5 and a relay coil R1, R2, R3, R4, R5. Leads 62, 63, 64, 65, and 66 join the conductor 43 with lines 56, 57, 58, 60, and 61 respectively. Each of the leads 62–66 contains a cab button B1, B2, B3, B4, B5. Thus, the circuit through relay R6 and any of the relay coils R1, R2, R3, R4, and R5 may be completed by depressing either of the corresponding cab or floor buttons.

Additionally, the relay circuit may be closed through a conductive path provided by lead 67, which contains four relay contacts C21, C22, C53, and C44 in parallel; and conductor 68. Five leads 70, 71, 72, 73, and 74 connect conductor 68 and the lines 56, 57, 58, 60, and 61 respectively. Each of the leads 70-74 contains a holding contact C31, C32, C33, C34, and C35 actuated by the relays R1, R2, R3, R4, and R5 respectively. The holding contacts permit the relay circuit, energized by the call buttons, to remain energized until the elevator reaches the selected floor even though the particular button initially energizing the circuit is depressed only momentarily.

*Control circuit*

Power for the control circuit is furnished by secondary 33 of transformer 34. Primary 75 of transformer 34 is connected across power lines 10 and 11 through leads 76 and 77 and fuse 78. Conductors 80 and 81 are joined to the ends of secondary 33; and primaries 82, 83, and 84 of transformers 85, 36, and 86 are connected in parallel across these conductors.

A transformer 86 has a secondary 87 which energizes the field 88 of tachometer 23 through rectifier 89, leads 90 and 91 and current limiting resistance 92. The tachometer output, which is proportional to the velocity of the cab, is carried by lines 93 and 94. Line 93 is connected to the tap 22 of potentiometer 19 and to one side of resistance 95. Line 94 is connected to the opposite end of resistance 95 through two parallel conductive paths. One path is constituted by line 96, itself having two parallel branches, one containing normally closed contact C16 of relay R16 and resistance 97, the other branch containing resistance 98. Line 100, which forms the second conductive path from line 94 to resistor 95, contains a resistance network comprising Globar resistances 101 and 102 in series with the parallel combination of Globar resistances 103 and 104. Resistor 99 joins line 105 and line 100. The resistors 101, 102, 103, 104 may be thyrite disks or any suitable nonlinear resistance material which has the property of varying its resistance in accordance with an inverse power of the applied voltage. With the elevator motor running near synchronous speed, this network provides a voltage signal which varies approximately as the fifth power of the tachometer voltage and consequently as the fifth power of cab velocity.

The output of tachometer 23 also energizes relay coil R15 through leads 94 and 105, and current limiting resistor 106. Relay coil R16 is energized through conductor 107, connected across lines 94 and 105. Conductor 107 contains a resistance 108 and resistance 109 shunted by a variable bypass tap 110. Relay 16 is adjusted to pull in or close the contact C16, when the motor is traveling at substantially (about .8) synchronous speed. Relay R15 is adjusted to close contact C15 shortly after the motor starts running (about 18 R. P. M.).

The secondary 35 of transformer 36 supplies voltage to the potentiometer 19 and the variable floor resistance network, shown generally at 18. Each end of secondry 35 is provided with a direct current rectifier 111 and 112. These ends are joined by contactor 113. A tap 114 is taken from the transformer secondary and is connected to one end of the resistor network 18, at 115, and to one end of the potentiometer coil 19. Lead 116 containing inductance 117 and resistor 118 connects line 113 to the opposite end of the potentiometer coil 19 and to the opposite end of resistance network 18, at 120. Resistance 118 is shunted by a variable by-pass tap 121. Lead 122 containing condenser 123 is connected across line 116 and the potentiometer coil 19.

The resistance network 18 comprises resistors 124, 125, 126, 127, 128 and 130 connected in series across terminals 115 and 120. By-pass tap 131 is used to vary resistance 130. Taps 132 and 133, joined by resistance 134 pick off resistances 130 and 128 respectively. Taps 135 and 136 joined by resistance 137 are in contact with resistance 127. Taps 138, 140 and 141, connected through resistances 142, 143, 144 pick off resistances 126, 125 and 124 respectively. Conductor 145 is connected to resistance 125 and resistance 142. Five taps, 146, 147, 148, 149 and 150 are provided to connect line 32 with a resistor network 18. Each of these taps is connected to line 32 through a contact C1, C2, C3, C4, or C5, operated by relay R1, R2, R3, R4 or R5 respectively. The voltage drop between line 32 and line 116 thus depends upon which of the relay contacts C1, C2, C3, C4 and C5 connects the resistor network to line 32.

Amplifier 24 is provided with two input leads 38 and 39. Input 38 is grounded through line 32 while input 39 is connected to tap 151 of resistance 152. One end of resistance 152 is connected to line 32 and the opposite end is connected to a tap 153 of resistance 95. The amplifier comprises two twin triode tubes 154 and 155 having the usual cathode heating elements, the elements and circuits being omitted for simplicity. Tube 154 has a grid 156 connected through resistance 157 to input lead 39. A second grid 158 is connected to the other amplifier input lead 38. Two cathodes 159 and 160 are interconnected and then grounded through resistance 161. Two plates are provided, 162 and 163, which are connected through conductors 164 and 165 to grids 166 and 167 of tube 155.

Tube 155 has two cathodes 168 and 170 which are tied together by lead 171 connected across relay coil R7. The coil of R7 is grounded through lead 172 and resistance 173. Tube 155 has two plates 174 and 175. Plate voltage is furnished by the secondary winding 176 of transformer 85. Each end of secondary 176 is provided with a direct current rectifier 177 and 178 and the ends are tied together through lead 180. A center tap 181 is connected to line 32 and also to line 180 through condenser 182. Line 180 containing inductance 183, is joined to plates 174 and 175 and is provided with a tap 184 in contact with resistance 185. Resistance 185 is connected in series with resistances 186 and 187 across lines 164 and 165.

Relay coil R7 is a polarized relay and its contact C7 has three distinct positions, an open position, one in which it closes line 188, and one which closes line 190. Lines 188 and 190 are joined to conductor 191, containing contact 192 of thermal time delay element 193 which is connected in series with resistance 189 across lines 194 and 195. Conductor 191 is connected to one side of secondary 33 of transformer 34 through lead 194. Line 188, which contains relay coil R11 and contact C41 of relay R11, is connected to the opposite side of secondary 33 through line 195. Likewise, line 190, which contains relay coil R12 and its contact C42, is joined to line 195. Relay coil R21 is shunted across relay coil R11 and contact C41, through lead 196. Relay R22 is similarly shunted across relay R12 and its contact C42, by lead 197. Conductor 198 interconnects lines 188 and 190.

Normally closed contacts, C13 and C14, operated by relay coils R13 and R14 are connected in series between conductor 198 and line 195. Relay coil R15 is a polarized relay, similar to relay R7, and has a three position contact, C15, which is adapted to close the circuit between lines 194 and 195 through either lead 200 or lead 201 and relay coil R14 or R13, respectively.

The control circuit also includes a branch comprising lead 202 which connects one input terminal of rectifier 31 to power line 12 through contact C17 of relay coil R17 and lead 45. The other input terminal of rectifier 31 is connected to power line 10 through lead 203 and line 76. Conductor 204, containing relay coil R17 and resistors 205 and 206, is connected across lines 45 and 67. Conductor 204 also has two parallel branch lines placed between the resistances 205 and 206. One branch line 207 contains relay coil R18, contact C12 of relay R12 and normally closed contact C20 of relay R20. Branch line 208 contains relay coil R20, contact C11 of relay R11, and normally closed contact C18 of relay coil R18. Thermal relay element 210, having normally closed contact 211, placed in line 41, is connected across lines 41 and 202 through conductor 212 and normally closed contact C24 of relay R24.

Rectifier circuit

The rectifier circuit is a direct current circuit supplied by the output of rectifier 31. Two lines 214 and 215 are connected to terminals 216 and 217 of rectifier 31. The brake solenoid 27 is connected across lines 214 and 215 through line 218 containing contact C23, actuated by relay R23. Line 218 has two parallel branches, one containing contact C38, the other containing contact C40, which contacts are actuated by relays R8 and R10 respectively.

The motor direction control relays, up and down relays R8, R10 are connected to line 215 through lines 220 and 221 and contacts C48 and C50 which are actuated by relay coils R18 and R20. Lines 220 and 221 are joined to line 214 through line 222 containing relay coil R23, car door switch 223 and hatch door interlock 224. Relay coil R23, when energized, closes contacts C43 in power lines 11 and 12 while the up and down relays R8 and R10 control the up and down contactors C8 and C10 in the motor power circuit. Relays R24 and R25 are also connected across lines 214 and 215 in parallel. These relays actuate contacts C24 and C25 respectively.

Operation of the system

To illustrate the operation of the circuit, suppose that the cab is stopped at floor 5, and that a passenger in the cab desires to be taken to floor 3 or that someone is waiting for the cab on floor 3. Either the passenger presses button B3 in the cab or the person waiting presses floor button F3. In either case, relays R3 and R6 are energized by the current flowing through lines 41 and 51.

Relay R6 which, when deenergized, shorts the input of the amplifier to ground through normally closed contact C36 and line 32, upon energization, opens contact C36 and closes contact C6. Contact C6 in line 80 closes the circuit from secondary 33 of transformer 34 to the primaries 83 and 84 of transformers 36 and 86.

Relay R3 closes contacts C3 and C33. C33 is a holding contact while C3 connects tap 148 of floor level resistor network 18 to line 32. This tap establishes the floor level signal in that the voltage from it to ground is proportional to the distance of the selected floor from an arbitrary reference point. Tap 22, due to the mechanical linkage of either the tap or the coil 19 with the motor 26, moves relative to the coil and at all times is in contact with the coil at a point such that the voltage across the coil is proportional to the height of the cab from the same arbitrary reference point. The voltage across line 32 and tap 22 thus represents an error voltage indicating by its magnitude and polarity the relative position of the cab and the floor selected. This error voltage is applied, through lines 32 and 93, across resistance 152.

With the cab at rest, the tachometer output is zero and the error voltage comprises only the floor signal voltage minus the cab signal voltage. With the transformer polarities arranged as shown, tap 22 will be at a higher potential than tap 148, therefore amplifier input lead 39 will be positive with respect to amplifier lead 38.

The potential of grid 156, which is connected to lead 39, is raised causing a greater plate current to flow from plate 163 to cathode 152. Plate 163 becomes less positive, lowering the potential on grid 167 of tube 155. As grid 167 becomes more negative, the current flowing in the plate cathode circuit including plate 175, cathode 168 and that portion of the coil of relay R7 shown to the left of grounded tap 172, decreases.

Simultaneously there is negative feed back to the left hand grid 156 of tube 154 in that the cathode 159 in becoming more positive increases the voltage drop across resistance 161. This raises the potential of cathode 160 relative to grid 158 which is grounded directly through input lead 38. Lowering the cathode to grid potential of grid 158 decreases the plate current flowing from plate 162 to cathode 160 thereby raising potential of the former and also of the right hand grid 166 of tube 155. The higher voltage on grid 166 causes a larger plate current to flow through that portion of relay coil R7 shown to the right of grounded tap 172. In consequence of the increased current flow in the right hand branch of the relay coil R7 and the decreased flow in the left hand branch, the contact C7 is magnetically forced to the left, closing line 188.

When line 188 is closed by contact C7, relay R11 is energized through lead 198, and closed contacts C13, C14. Relay R21 is simultaneously energized through lead 188 and 196. Relay 21 closes contact C21 in line 67 and hence, a circuit across line 41—55 is completed through leads 67, 68, 72 and 58 causing the relays R3 and R6 to hold in (remain energized) during the rest of the cycle of operation even though the call button is released.

Relay R11 actuates contact C11, closing the circuit across lines 45 and 67 to energize relay coils R17 and R20. Relay R17 closes contact C17 completing the circuit to the rectifier 31 through lines 45 and 203. Relay R20 simultaneously opens contact C20 to prevent any current from flowing through line 207 and closes contact C50 energizing down relay R10 and relay R23. Relay R23 actuates contacts C23 in line 218 and C43 in power lines 11 and 12, while relay R10 actuates contacts C10 and C40 closing the brake solenoid circuit across lines 214 and 215 and closing the motor circuit to power lines 10, 11 and 12 to cause motor operation in the down direction.

Thus, the brake is released and a voltage is supplied to the motor causing it to drive the cab downwardly toward the selected floor. As the elevator accelerates the tachometer voltage will increase and relay R15 is sufficiently energized thereby to close contact C15, energizing relay R13. Relay R13 opens contact C13 in series with relay R11, simultaneously closing a holding contact C53 in the call button circuit. Relay R11 however will remain energized through holding contact C41 which is connected in parallel with the contacts C13 and C14.

The tachometer voltage also energizes relay R16 which is adjusted to open contact C16 when the motor approaches synchronous speed, removing resistor 97 from line 96. Resistance 98 is then connected in parallel with the Globar resistances 101, 102, 103 and 104 so that the tachometer voltage varies as a power of cab velocity. While in the embodiment shown the tachometer voltage varies as an exponential power of cab velocity, it will be understood that in certain installations it may be desirable to provide a resistance network causing the voltage to vary as some other function of velocity.

As the cab approaches the floor level, the sum of the combined potentiometer, floor resistance network, and velocity voltages becomes zero. When the amplifier input voltage is thereby reduced to zero, relay R7 is deenergized and contact C7 moves to a neutral position, deenergizing relays R11 and R21. This opens contacts C11 and C21 which interrupts the rectifier supply circuit by deenergizing relay R17 and opening contact C17. Upon deenergization of the rectifier 31 the current to brake solenoid 27 is interrupted and the brake is applied while the down contacts C10 in the motor circuit are opened to deenergize the motor. The cab then slides into the floor level where it is brought to rest by the action of the friction brake.

It will be noted that once deenergized, it is impossible for either of the relays R11 or R12 to be reenergized until the cab velocity reaches approximately zero since the contact C13 in series with these relays is opened. Relay R21 can, however, be reenergized thus keeping the call button circuit closed.

Thermal time delay element 193, connected across the lines 194 and 195, is energized whenever power is supplied to transformer 34. The time delay element has a contact 192 which prevents current from flowing through relay coils R11 and R12 until the control circuit has been energized for a sufficient length of time to permit the tubes 154 and 155 to be properly heated. After a predetermined interval of time, thermal element 193 becomes heated, closing contact 192 to permit functioning of relays R11 and R12.

Other precautionary devices include relay coil R24 having normally closed contact C24, and thermal relay 210 having a normally closed contact 211. Thermal element 210 is connected in series with contact C24 across input lines 41 and 51 and rectifier 31. If power should be supplied to the rectifier for an appreciable time and contact C24 remains closed, the element 210 will open contact 211 to interrupt power supply to the call buttons. However, relay R24 is connected across the brake solenoid 27 so that if the solenoid and up or down relay coil is energized contact C24 will open removing element 210 from the circuit so that contact 211 will remain closed. A second relay coil R25 is energized whenever power is available in the rectifier output circuit across lines 214 and 215. This relay coil has a normally closed contact C25 which opens the floor button circuit to prevent a call, made while the cab is in motion, while affecting cab movement until after the cab has been stopped at the already selected floor.

Having described our invention, we claim:

1. An elevator system comprising a cab, a motor for driving said cab, motor direction control relays, a control circuit, and means for operating said relays in response to said control circuit, said control circuit having an applied electromotive force equal to the sum of three voltages, the first voltage being dependent upon the position of the cab relative to a predetermined reference, the second voltage being dependent upon the position of a selected floor relative to the same reference and the third voltage being dependent upon the velocity of the cab.

2. An elevator system comprising a cab, a motor for driving said cab, a brake for stopping said cab, means for applying said brake whenever the motor is deenergized, and means for controlling the periods of motor energization in response to a control circuit, which circuit is characterized by an electromotive force consisting of the sum of a voltage dependent upon the position of said cab relative to a predetermined reference, a voltage dependent upon the position of the selected floor relative to the same arbitrary reference and a voltage dependent upon the velocity of the cab.

3. In an elevator levelling system including a cab and a motor, the combination of a brake for stopping said cab, a control circuit, means for applying said brake in response to said control circuit, said control circuit having an applied electro-motive force consisting of a first voltage dependent upon the position of the cab relative to an arbitrary reference, a second voltage dependent upon the position of a selected floor relative to the same reference, and a third voltage dependent upon the velocity of the cab, said first voltage and said third voltage having a polarity opposed to that of said second voltage whereby the brake is applied at varying cab positions relative to the selected floor, which positions depend upon the velocity of said cab.

4. In an elevator system having a plurality of call buttons associated with various floors of a building, the combination of a cab, a motor for driving said cab, a brake, means for applying said brake whenever said motor is deenergized, motor direction control contacts, and means including a polarized relay for operating said contacts in response to a control circuit, said control circuit including a tachometer in mechanical interconnection with said motor whereby the tachometer output voltage is proportional to the cab speed, a control voltage supply, a floor resistor network connected to said control voltage supply and having a plurality of taps adapted for connecting said resistor network to said control circuit, the particular tap interconnecting said floor resistance network and said control circuit being determined by the depression of a call button, the voltage across one end of the resistance network and said tap being dependent upon the height of the floor, associated with said depressed call button, from a predetermined reference, a potentiometer connected to said control voltage supply and having a coil and a tap, said potentiometer coil and said tap being moved relative to each other in synchronism with the movement of said cab so that the voltage across one end of the potentiometer coil and tap is proportional to the height of said cab from said predetermined reference point, the sum of said tachometer voltage, potentiometer voltage and resistance network voltage controlling said polarized relay whereby the motor direction control contacts are operated in accordance with the polarity of the control circuit voltage and when said voltage reaches zero, the motor will be deenergized and the brake applied.

5. In an elevator system for levelling a cab with various floors of a building, a motor for driving said cab, motor direction control contactors, a circuit for controlling said motor direction control contactors, and means in said circuit for determining the position of said cab relative to a selected floor, said means comprising a control voltage supply, a resistor network connected to said control voltage supply and having a plurality of taps adapted for connecting said resistor network to said control circuit, the voltage drop across said resistance network to the particular tap interconnecting said floor resistance network and said control circuit being dependent upon the height of the selected floor from a predetermined reference, and a potentiometer connected to said control voltage supply and having a coil and a tap, said potentiometer coil and said tap being moved relative to each other in synchronism with the movement of said cab so that the voltage across the potentiometer coil and tap is proportional to the height of said cab from said predetermined reference point.

6. In an elevator levelling system having a cab, a motor for driving said cab, motor direction contactors and a circuit for controlling said direction contactors, means in said circuit for determining the position of said cab relative to a selected floor, said means comprising a control voltage supply, a variable floor resistor connected to said control voltage supply, means for varying the voltage across said resistor whereby a specific voltage is impressed upon the control circuit for each of the various floors of a building, and a potentiometer connected to said control voltage supply and having a coil and a tap, said potentiometer coil and said tap being moved relative to each other in synchronism with the movement of said cab so that the voltage across the potentiometer coil and tap is proportional to the height of said cab from said predetermined reference point and is opposed to said floor resistor voltage.

7. In an elevator system having a cab, a motor for driving said cab, and a brake adapted to set whenever the motor is deenergized, means for deenergizing said motor and applying said brake at a distance from a selected floor dependent upon the velocity of said cab, said means including a tachometer in mechanical interconnection with said elevator motor whereby the tachometer output voltage is proportional to the cab speed, and a non-linear resistance network for varying said tachometer output voltage as a predetermined function of cab speed.

8. Apparatus for automatically levelling a cab in an elevator system having a motor, the energization of said motor being electrically controlled, said apparatus comprising a control circuit, means for applying to the control circuit an electrical quantity proportional to the height of said cab above a reference, means for applying to said circuit a standard electrical quantity representing the height at which the cab is to be stopped, said quantities being compared in said control circuit so that an electrical quantity results from said comparison when the circuit is unbalanced, control means to which said resultant electrical quantity is applied to govern the motor energization whereby the unbalanced state of said control circuit is decreased.

9. Apparatus for automatically levelling a cab in an elevator system having a motor, the energization of said motor being electrically controlled, said apparatus comprising, a control circuit, means for applying to the control circuit an electrical quantity proportional to the height of said cab above a reference, means for applying to said circuit a standard electrical quantity representing the height at which the cab is to be stopped, and means for applying to said circuit an electrical quantity proportional to the velocity of said cab, said quantities being compared in said control circuit so that an electrical quantity results from said comparison when the circuit is unbalanced, control means to which said resultant electrical quantity is applied to govern the motor energization whereby the unbalanced state of said circuit is decreased.

10. An elevator levelling system comprising a cab, a motor, a brake for stopping said cab, a control circuit, means for applying said brake in response to said control circuit, said control circuit having an applied electromotive force consisting of a first voltage dependent upon the position of the cab relative to an arbitrary reference, a second voltage dependent upon the position of a selected floor, and a third voltage dependent upon the velocity of the cab, said third voltage being generated by a tachometer mechanically interconnected to said motor, said third voltage passing through a resistance network comprising non-linear resistance elements whereby said third voltage varies as a function of cab velocity, said third voltage having a polarity similar to said first voltage and opposed to that of said second voltage whereby the electromotive force of said control circuit will become zero at a cab position relative to a selected floor, determined by the velocity of said cab, said means for applying said brake being operative whenever the electromotive force of said control circuit becomes zero.

11. In an elevator levelling system including a cab and a motor for driving the cab, the combination of a brake for stopping said cab, a control circuit, means responsive to said control circuit for applying said brake, said control circuit having an applied electromotive force consisting of a first voltage dependent upon the position of the cab relative to an arbitrary reference, a second voltage dependent upon the position of a selected floor relative to the same reference, and a third voltage dependent upon the velocity of the cab, means including a non-linear resistance network and a relay responsive to said third voltage for varying said third voltage as an exponential power of cab velocity when said motor is running near synchronized speed or linearly with cab velocity when the motor is running at a lesser speed.

12. An elevator levelling system comprising a cab, a motor for driving said cab, motor direction contactors for controlling the energization of said motor, a control circuit for governing said contactors, a plurality of call buttons associated with various floors of a building, a control voltage supply, a variable floor resistor connected to said control voltage supply and having a plurality of taps adapted to interconnect said resistance and said control circuit, depression of one of said call buttons determining the particular tap interconnecting said resistor and said control circuit, whereby the voltage drop across said resistor is made proportional to the height of the floor associated with said depressed call button above a predetermined reference, a potentiometer connected to said control voltage supply and having a coil and a tap, said potentiometer coil and said tap being moved relative to each other in synchronism with the movement of said cab, so that the voltage drop across the tap and one end of the potentiometer coil is proportional to the height of said cab from said predetermined reference point, said voltage drops being compared in said circuit so that an error voltage results when said cab and said floor are not aligned, and means including a polarized relay to which said error voltage is applied to govern said contactors.

13. An elevator levelling system comprising a cab, a motor for driving said cab, motor direction contactors for controlling the energization of said motor, a control circuit for governing said contactors, a plurality of call buttons associated with various floors of a building, a control voltage supply, a variable floor resistor connected to said control voltage supply and having a plurality of taps adapted to interconnect said resistance and said control circuit, depression of one of said call buttons determining the particular tap interconnecting said resistor and said control circuit whereby the voltage drop across said resistor is made proportional to the height of the floor associated with said depressed call button above a predetermined reference, a potentiometer connected to said control voltage supply and having a coil and a tap, said potentiometer coil and said tap being moved relative to each other in synchronism with the movement of said cab, so that the voltage drop across the top and one end of the potentiometer coil is proportional to the height of said cab from said predetermined reference point, a tachometer in mechanical interconnection with said motor and in electrical interconnection with said control circuit whereby a voltage proportional to the speed of said cab is introduced into said circuit, said voltages being compared in said circuit so that an error voltage results when said cab and said floor are not aligned, and means including a polarized relay to which said error voltage is applied to govern said contactors.

14. In an elevator system having a cab, a motor for driving said cab, means for deenergizing said motor when said cab is at a distance from a selected floor, said distance varying in accordance with the velocity of said cab, said means including a tachometer in mechanical interconnection with said elevator motor, said tachometer being continuously effective to generate an output voltage proportional to the cab speed.

15. In an elevator system having a cab, a motor for driving said cab and a brake adapted to set whenever the motor is deenergized, means for applying said brake at a distance from a selected floor dependent upon the velocity of said cab, said means including a tachometer in mechanical interconnection with said elevator motor whereby the tachometer continuously generates an output voltage proportional to the cab speed.

16. In an elevator system, means for determining the relative position of a cab and a selected floor, said means comprising a control circuit, said control circuit having a first voltage applied thereto, said first voltage being characteristic of the floor at which the cab is to be stopped, and a second voltage applied thereto, said second voltage being variable in accordance with the position of the cab.

17. In an elevator system including a cab and a motor for energizing said cab, means for automatically levelling the cab with a selected floor, said means including a control circuit for governing the periods of motor energization, said control circuit having a signal continuously produced therein dependent upon the position of the cab relative to the selected floor.

18. In an elevator system including a cab, a motor for energizing said cab, and a brake for stopping said cab, means for bringing the cab to rest at a selected floor, said means including a control circuit for governing the period of application of the brake, said control circuit having a voltage signal continuously produced therein dependent upon the position of the cab relative to the selected floor.

19. In an elevator system including a cab, a motor for driving said cab, and a brake for stopping said cab, means for automatically levelling said cab with a selected floor, said means including contactors for deenergizing said motor and applying said brake, and a control circuit for actuating said contactors while said cab is displaced a predetermined distance from said floor.

20. In an elevator system including a cab, a motor for driving said cab, and a brake for stopping said cab, first means for automatically leveling said cab with a selected floor, said first means including a control circuit and second means responsive to said control circuit for deenergizing said motor and applying said brake, said control circuit having a signal produced therein dependent upon the position of the cab relative to the selected floor, and a second signal produced therein dependent upon the velocity of said cab, said control circuit also including third means for comparing said signals.

References Cited in the file of this patent

UNITED STATES PATENTS

| Number | Name | Date |
|---|---|---|
| 1,709,102 | Waite et al. | Apr. 16, 1929 |
| 1,781,443 | Rodman | Nov. 18, 1930 |
| 2,145,809 | Taylor | Jan. 31, 1939 |
| 2,403,125 | Santini | July 12, 1946 |